United States Patent [19]

Stables et al.

[11] 3,821,208

[45] June 28, 1974

[54] RECOVERY OF CEPHALOSPORIN C AND DERIVATIVES THEREOF

[75] Inventors: Harry Carson Stables; John Atherton, both of Ulverston; Michael John Matchan, Barrow-in-Furness, all of England

[73] Assignee: Glaxo Laboratories Limited, Greenford, Middlesex, England

[22] Filed: Aug. 17, 1971

[21] Appl. No.: 172,553

[30] Foreign Application Priority Data
Aug. 25, 1970 Great Britain..................... 40880/70

[52] U.S. Cl............................ 260/243 C, 424/246
[51] Int. Cl............................................. C07d 99/24
[58] Field of Search............................... 260/243 C

[56] References Cited
UNITED STATES PATENTS

| 3,498,979 | 3/1970 | Crisp | 260/243 C |
| 3,661,901 | 5/1972 | Bickel et al. | 260/243 C |

*Primary Examiner*—Nicholas S. Rizzo
*Attorney, Agent, or Firm*—Bacon & Thomas

[57] ABSTRACT

A process for the recovery of cephalosporin C as a derivative thereof from a cephalosporin C - containing aqueous medium, e.g., a fermentation broth includes the step of contacting the medium with formaldehyde and a β-ketoester followed by isolation of the derivative of cephalosporin C so formed, e.g., by extraction into an organic solvent.

11 Claims, No Drawings

RECOVERY OF CEPHALOSPORIN C AND DERIVATIVES THEREOF

This invention is concerned with improvements in or relating to the recovery of cephalosporin C.

The cephalosporin compounds other than cephalosporin C referred to in this specification are generally named with reference to cephem (see J. Amer. Chem. Soc. 1962, 84, 3,400). The term "cephem" refers to the basic cepham structure with one double bond.

Cephalosporin C [3-acetoxymethyl-7β-(D-5-amino-5-carboxypentanamido)ceph-3-em-4-carboxylic acid] is a compound of great importance in the field of antibiotics. Although it possesses antibiotic activity, its main use is as an intermediate in the preparation of semi-synthetic cephalosporin antibiotics. Thus it may be converted to 3-acetoxymethyl-7β-aminoceph-3-em-4-carboxylic acid (hereinafter referred to as 7-ACA) by cleaving the amido linkage of the D-5-amino-5-carboxypentamido side chain, and the 7-ACA may then be subjected to acylation to yield a wide variety of derivatives; the 7-ACA structure may also be modified at the 3-position. In these ways a range of semi-synthetic cephalosporin antibiotics can be prepared. Thus it will be seen that the efficient production of cephalosporin C is of great importance.

Cephalosporin C is produced on a large scale by fermentation of Cephalosporium acremonium in a nutrient aqueous broth. At the end of the fermentation the cephalosporin C is present in dilute solution together with a large number of contaminants. These include the residue of the original components of the nutrient broth, e.g., one or more sources of nitrogen, carbon and sulphur. When a "synthetic" broth is used, these sources will be chemical nutrients, such as ammonium salts, nitrates, sugars, etc; alternatively, a non-synthetic broth containing, e.g., corn steep liquor or molasses may be used.

Apart from the original components of the broth, there will also be present by-products produced during the fermentation, e.g., proteins, carbohydrates and penicillin compounds, produced by the microorganism simultaneously with the cephalosporin C.

The recovery of cephalosporin C from this mixture is a problem of long standing to which no wholly satisfactory solution has hitherto been proposed. The recovery processes currently used generally depend on filtration followed by more or less complex adsorption procedures using active charcoal and ion-exchange materials. The principal difficulty is the chemical nature of cephalosporin C, which precludes direct solvent extraction. Not only are recovery processes complex and time-consuming but they are also inefficient, since a proportion of the desired product decomposes during the protracted manipulations involved. Large volumes of solvent are also needed, which can only be recovered by relatively costly procedures.

There is therefore a need for a process by which cephalosporin C or a derivative thereof can be recovered from a fermentation broth or other aqueous medium with good efficiency.

According to one aspect of the invention there is provided a process for the recovery of cephalosporin C as a derivative thereof from a cephalosporin C-containing aqueous medium which includes the step of contacting the medium with formaldehyde and a β-ketoester, particularly a β-ketoester of general formula

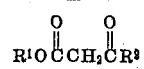

(wherein $R^1$ and $R^2$ are the same or different and are selected from alkyl, aralkyl, cycloalkyl, aryl and heterocyclic groups) whereby the cephalosporin C is converted to a derivative wherein the nitrogen atom of the amino group on the D-5-amino-5-carboxypentanamido side chain is incorporated into a dihydropyridine ring, whereafter the resulting derivative of cephalosporin C is isolated from said aqueous medium, e.g., by extraction with an organic solvent.

The aqueous medium will generally be derived from a fermentation broth, but the invention is generally applicable to the recovery of cephalosporin C from aqueous media.

Our invention has several desirable features, notably that the protecting group on the nitrogen atom of the amino group on the D-5-amino-5-carboxypentanamido side chain can be formed under mild conditions (e.g., at a pH near neutrality, ambient temperature and at considerable dilution), and that the protecting group can be removed again very readily, also under mild conditions.

The formaldehyde should normally be used in a proportion of at least one mole per mole of cephalosporin C and may be used in considerable excess, e.g. up to 10 moles per mole of cephalosporin C. Formaldehyde is often added to a fermentation broth to sterilise it when fermentation is complete, and in this case it may be found that no additional formaldehyde need be added for the purposes of this invention.

The β-ketoester (I), for economic reasons, is preferably a compound in which $R^1$ and $R^2$ are alkyl groups. Such alkyl groups may be lower alkyl groups, i.e., alkyl groups containing 1–6 carbon atoms, e.g., methyl or ethyl groups.

When $R^1$ and/or $R^2$ represents an aralkyl group, this may, e.g., be a benzyl or phenethyl group or substituted derivative thereof, possible substituents including lower alkyl groups, nitro groups and halogen atoms. When $R^1$ and/or $R^2$ represents an aryl group, this may e.g. be a phenyl, tolyl, p-nitro-phenyl, p-halophenyl or α- or β- naphthyl group.

When $R^1$ and/or $R^2$ represents a cycloalkyl group this may be a cyclopentyl or cyclohexyl group.

When $R^1$ and/or $R^2$ represents a heterocyclic group, this may e.g. be a furyl, tetrahydrofuryl, thienyl or pyridyl group. Heterocyclic groups of principal interest have 5 or 6 ring members and contain one or more heteroatoms selected from oxygen, nitrogen and sulphur.

Examples of β-ketoesters include methyl acetoacetate, ethyl acetoacetate, benzyl acetoacetate, ethyl benzoyl-acetate and 4-chlorophenyl phenylacetylacetate.

The β-ketoester should be used in a proportion of at least about two moles per mole of cephalosporin C, but an excess, e.g., up to 30 moles may be used if desired. Generally only one β-ketoester will be employed, but if desired a mixture of two or more such compounds may be used. In this case cephalosporin C derivatives will be a mixture of compounds derived from the two or more β-ketoesters used.

By way of illustration, the following reaction scheme shows the reaction of formaldehyde and ethyl acetoacetate with cephalosporin C ($RNH_2$):

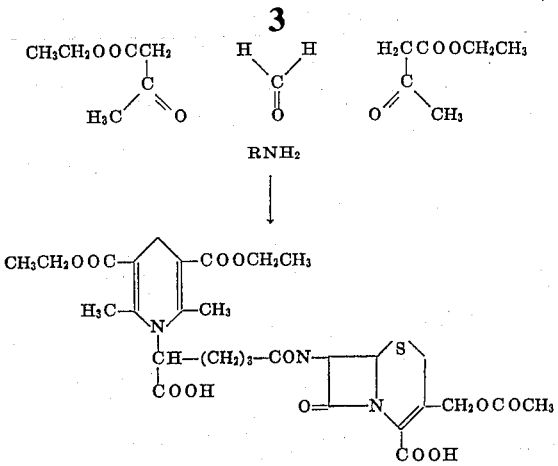

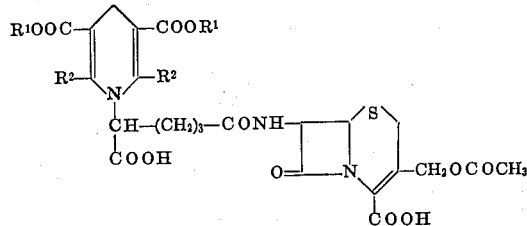

wherein the groups R[1] and R[2] are as defined above; and salts, e.g., alkali metal salts, thereof.

When the aqueous medium from which cephalosporin C is to be extracted is a fermentation broth, it is normally desirable to pre-treat this before subjecting it to the process according to the invention. Normally the broth will be acidified to e.g., pH 2, e.g., by adding a dilute mineral acid; a proportion of proteinaceous material will generally be precipitated by this process. The broth will then be filtered to remove mycelium and other solid impurities, and the pH adjusted to about 7. It is also desirable to remove ammonium ions from the broth by treatment with an ion exchange medium, e.g. in a column. It will be understood that ammonium ions will tend to react with the formaldehyde and β-ketoester in the same manner as the amino group of the cephalosporin C.

The pre-treated broth may then be reacted with β-ketoester at this point. If the pre-treated broth was initially sterilised with formaldehyde no further formaldehyde is required at this stage. If however the broth was not sterilised, then formaldehyde should now be added in excess. Advantageously the β-ketoester and the formaldehyde are added in two separate streams. If the β-ketoester is not sufficiently soluble in water, a co-solvent, e.g., acetone may be employed to facilitate reaction.

The process according to the invention may be carried out at low temperatures, e.g., in the range 0° – 50°C, for example 10° – 30°C. The temperature must be selected to give a satisfactory reaction rate with the reactants employed; using highly reactive β-ketoesters the reaction proceeds readily at room temperature of about 15° – 25°C.

The pH of the reaction mixture should be controlled to secure suitable conditions for the reaction and to prevent a decomposition of the cephalosporin C. It is one advantage of the process according to the invention that it can be performed at substantially neutral pH, e.g., in the range pH 6 – 8.5, preferably at about pH 7. The pH of the reaction mixture may be adjusted as necessary, e.g., with potassium or sodium hydroxide.

The reaction time will vary depending on the reagents used and the temperature and pH, but substantially complete reaction will ordinarily be achieved in from 5 minutes to 5 hours.

The progress of the reaction may be monitored by U.V. assay. The formation of the dihydropyridine derivative is accompanied by the appearance of a peak at about 303 nm. Alternatively the reaction can be followed by the fall in pH resulting from reaction of the amino group in the side chain of the cephalosporin C. Normally an alkali, e.g., an alkali metal hydroxide such as sodium or potassium hydroxide will be added continuously or portion-wise during the reaction to maintain the pH at a desired level. When the pH remains steady without alkali being added, the reaction is substantially complete.

When the formation of the derivative of cephalosporin C is thought to be substantially complete, the derivative may be isolated from the reaction mixture. In some cases the derivative may be isolated simply by adjusting the pH to a suitable value close to the isoelectric point, e.g., about pH 2.2, and filtering off or otherwise separating the precipitated derivative. Whether or not this is possible will largely depend on the nature of the groups R[1] and R[2] in the β-ketoester compound.

Alternatively the derivative may be isolated by extraction with an organic solvent. It is important to adjust the pH to a suitable value in order to ensure that the derivative passes into the organic phase. A suitable pH will normally be found to be in the range pH 1 – 4 e.g., about pH 2. It will be understood that at high pH the carboxyl groups on the cephalosporin residue will be ionized, while at low pH the tertiary nitrogen atoms will be protonated; both these states make the derivative undesirably hydrophilic so that extraction from the aqueous phase is retarded. The pH may be adjusted to a desired value with a dilute mineral acid, e.g., hydrochloric, sulphuric or phosphoric acid.

The organic solvent must be water-immiscible, although it may have some solubility in water; clearly it should be a solvent in which the derivative of cephalosporin C has appreciable solubility. Examples of suitable solvents include alkyl esters of carboxylic acids, e.g., lower alkyl esters of lower alkanoic acids such as ethyl acetate, propyl acetate, isopropyl acetate, butyl and amyl acetate; water-immiscible alcohols, e.g., alkanols having at least four carbon atoms such as n-butanol and amyl alcohol; ketones, e.g., dilower alkyl ketones such as methyl ethyl methyl and mehtyl isobutyl ketone; and halogenated hydrocarbons, e.g., halogenated lower alkanes such as methylene chloride and chloroform. A particularly useful solvent is butyl acetate.

The extraction may be performed in any convenient way. A multiple extraction using several portions of organic solvent may be used, but elaborate extraction procedures, e.g., in a countercurrent extraction apparatus may not be necessary if the solvent is correctly chosen. If desired, the extract may be concentrated by evaporation.

Further treatment of the extract will depend on the chemical transformation to which the derivative is to be subjected. If desired the derivative may be isolated in the solid state by evaporation of the organic solvent followed if necessary by recrystallisation or other purification procedure. Another procedure which may form a step in the purification procedure, is precipitation of the derivative as a sparingly soluble salt, e.g., an alkali metal salt, as described below.

On the other hand the derivative will often be required for the production of 7-ACA. We have found that the derivative may be used, without further chemical transformation, as the starting material for the production of 7-ACA by the imide halide method.

This method involves reacting the acylamido compound with an agent believed to form an imide halide, e.g., phosphorus pentachloride, converting the product of the reaction into a product believed to be an imino ether by reaction with an alcohol and cleaving the latter e.g., by hydrolysis to yield the desired 7-amino compound. Although the exact nature of the intermediate products is not known they are referred to herein, for convenience, as imide halides and imino ethers. The imide halide method is described in British Pat. No. 1,041,985; Belgian Pat. Nos. 718,824 and 719,712 and in Dutch Pat. application No. 6812413.

An organic solvent extract may be used directly for the imide halide method. However, it is advantageous, especially when the solvent is very volatile, to isolate the derivative. For example, one may reextract the derivative of cephalosporin C into aqueous solution using a base to bring the pH to a value in the range 4.0 – 7.5. The base may be inorganic, e.g., an alkali metal bicarbonate or hydroxide, or organic, e.g., pyridine or triethylamine. The aqueous phase is then separated and may be evaporated (preferably by freeze drying) to yield a salt of the derivative, for example, the mono- or disodium or mono- or di-potassium salts, which may then be dissolved in a solvent suitable for the imide halide method.

Alternatively, the separated aqueous phase may be acidified and extracted with an organic solvent to yield a solution of the dicarboxylic acid form of the derivative. The solvents mentioned above are suitable, methylene chloride being preferred. The organic solvent extract may then be used for the imide halide method.

Another method of isolating the derivative from an organic solvent extract is to precipitate it as a salt, preferably an alkali metal salt, e.g., the monosodium salt. The salt may be formed by double decomposition with, e.g., an alkali metal salt of a fatty acid, for example sodium 2-ethylhexanoate. In order to obtain a dry product, the organic solvent extract should preferably be dried before the salt is precipitated, e.g., by azeotropic distillation or by contact with a drying agent.

When it is desired to obtain cephalosporin C from the derivative thereof, this may be achieved by treating the derivative, e.g., as an organic solvent extract thereof with one or more of the following reagents: an acid addition salt of a primary amine; an amino-acid; or an ammonium salt of a weak acid. These reagents will generally be added in aqueous solution to an organic solvent solution or a re-extracted aqueous solution of the dihydropyridine derivative. The acid addition salt of a primary amine may be, e.g., the addition salt of an organic or inorganic acid (e.g., hydrochloric or sulphuric acid) with a lower alkyl-amine; examples of suitable salts include methylamine hydrochloride and ethylamine hydrochloride. Suitable amino acids include glycine, alanine and valine. The ammonium, salt of a weak acid may be a salt of a carboxylic acid, e.g., a lower alkanoic acid. Ammonium acetate is an example of a suitable salt.

The pH of the reaction mixture, i.e., at the commencement of the reaction involving the breakdown of the dihydropyridine derivative should be near neutrality, preferably weakly acidic, e.g., in the range pH 4.5 – 7.5, advantageously 5.5 – 6.0.

The regeneration of cephalosporin C may be effected by treating a solution of the derivative in an organic solvent with the reagent, e.g., in aqueous solution. If an aqueous phase is present the cephalosporin C will pass into it, while if no aqueous phase, or only one of small volume, is present the cephalosporin C will be precipitated.

The cephalosporin C may then be obtained from the aqueous phase in known manner, e.g., by precipitating as the potassium salt, for example using potassium acetate and acetone. The by-products of the reaction will generally remain in the organic phase.

The cephalosporin C so obtained, whether by precipitation or by evaporation (e.g., by freeze drying) of the aqueous phase, may then be further converted to 7-ACA., e.g., by the imide halide method to remove the 7-(D-5-amino-5-carboxypentanoyl) side chain, or this may be performed by the nitrosyl chloride method, e.g., as described in British Pat. Nos. 948,858 and 1,017,534. In such processes involving the imide halide method it is necessary to protect the carboxyl group at the 4-position. A variety of methods of doing this are available.

The group protecting the 4-carboxyl group may be formed with an alcohol (aliphatic or araliphatic), phenol, silanol, stannanol or acid which may readily be split off at a later stage of the reaction.

Suitable esters thus include compounds containing as 4-ester group, a group selected from the following list which is not intended to be an exhaustive list of possible ester groups (i) - COOCR$^a$R$^b$R$^c$ wherein at least one of R$^a$, R$^b$ and R$^c$ is an electron-donor, e.g., p-methoxyphenyl, 2,4,6-trimethylphenyl, 9-anthryl, methoxy, acetoxy or fur-2-yl. The remaining R$^a$, R$^b$ and R$^c$ groups may be hydrogen or organic substituting groups. Suitable ester groups of this type include p-methoxy benzyloxycarbonyl and 2,4,6-trimethylbenzyloxycarbonyl.

(ii) -COOCR$^a$R$^b$R$^c$ wherein at least one of R$^a$, R$^b$ and R$^c$ is an electron-attracting group, e.g., benzoyl, p-nitrophenyl, 4-pyridyl, trichloromethyl, tribromomethyl, iodomethyl, cyanomethyl, ethoxycarbonylmethyl, arylsulphonylmethyl, 2-dimethylsulphoniumethyl, o-nitrophenyl or cyano. The remaining R$^a$, R$^b$ and R$^c$ groups may be hydrogen or organic substituting groups. Suitable esters of this type include benzoylmethoxycarbonyl, p-nitrobenzyloxycarbonyl, 4-pyridyl-methoxycarbonyl, 2,2,2-trichloroethoxycarbonyl and 2,2,2-tribromoethoxycarbonyl.

(iii) - COOCR$^a$R$^b$R$^c$ wherein at least two of R$^a$, R$^b$ and R$^c$ are hydrocarbon such as alkyl, e.g., methyl or ethyl, or aryl, e.g., phenyl and the remaining R$^a$, R$^b$ and R$^c$ group, if there is one, is hydrogen. Suitable esters of this type include, t-butyloxycarbonyl, t-amyloxycarbonyl, diphenylmethoxycarbonyl and triphenylmethoxycarbonyl.

(iv) -COOR$^d$ wherein R$^d$ is adamantyl, 2-benzyloxyphenyl, 4-methylthiophenyl, tetrahydropyran-2-yl or tetrahydrofur-2-yl.

Silyl esters may conveniently be prepared from a halosilane or a silazane of the formula R$_3^4$SiX; R$_2^4$SiX$_2$; R$_3^4$Si.NR$_2^4$; R$_3^4$Si.NH.SiR$_3^4$; R$_3^4$Si.NH.COR$^4$; R$_3^4$Si.NH.CO.NH.SiR$_3^4$; R$^4$NH.CO.NR$^4$.SiR$_3^4$; or R$^4$C(OSiR$_3^4$):NSiR$_3^4$ where X is a halogen and the various groups R$^4$, which can be the same or different, represent hydrogen atoms or alkyl, e.g., methyl, ethyl, n-propyl, iso-propyl; aryl, e.g., phenyl; or aralkyl, e.g., benzyl groups.

Preferred derivatives of silanols are silyl chlorides such as for example trimethylchlorosilane and dimethyl-dichlorosilane.

The carboxyl groups may be regenerated from an ester by any of the usual methods; for example, acid- and base-catalysed hydrolysis (especially for silyl and stannyl esters) is generally applicable, as well as enzymically-catalysed hydrolyses; however, aqueous mixtures may be poor solvents for these compounds and they may cause isomerizations, rearrangements, side-reactions, and general destruction, so that special methods may be desirable. Five suitable methods of deesterification are:

(i) Reactions with Lewis acids: Suitable Lewis acids for reaction with the esters include trifluoroacetic acid, formic acid, hydrochloric acid in acetic acid, zinc bromide in benzene and aqueous solutions or suspensions of mercuric compounds. The reaction with the Lewis acid may be improved by addition of a nucleaphile such as anisole.

(ii) Reduction: Suitable systems for effecting reduction are zinc/acetic acid, zinc/formic acid, zinc/lower alcohol, zinc/pyridine, palladised-charcoal and hydrogen, electrolysis, and sodium and liquid ammonia.

(iii) Attack by nucleophiles: Suitable nucleophiles are those containing a nucleophilic oxygen or sulphur atom for example alcohols, mercaptans, thiocyanates and water.

(iv) Oxidative methods: for example, those which involve the use of hydrogen peroxide and acetic acid.

(v) Irradiation.

One may also effectively protect the 4-carboxyl group by forming an anhydride with another acid. Protection of the carboxyl group in this way is not only achieved in an economic fashion but also has the important additional advantage that no final step of deprotection is required at the end of the imide halide process, the desired 4-carboxyl group of the 3-acetoxymethyl-7-aminoceph-3-em-4-carboxylic acid being readily regenerated by water in the final hydrolysis step.

Formation of a mixed anhydride may be achieved by reacting the cephalosporin compound with an acid halide. One may thus employ halides of alkanoic acids having up to seven carbon atoms and halogenated derivatives thereof, e.g., acetyl chloride, propionyl chloride, or chloroacetyl chloride.

Formation of the mixed anhydride may be readily achieved in an inert solvent under substantially anhydrous conditions by reacting a salt of the cephalosporin compound formed with an inorganic or organic base, e.g., a sodium or potassium salt, with the acid halide.

The mixed anhydrides may be formed by analogy with the process described in Belgium Pat. No. 758,800.

In order that the invention may be better understood, the following examples are given by way of illustration only.

EXAMPLE 1

To 1 litre of aqueous solution containing 20g. of potassium cephalosporin C (free acid content 82.9 percent) was added 70ml. of ethyl acetoacetate and 52ml. of 37 percent aqueous formaldehyde. The mixture was stirred for 90 mins, maintaining the pH at 7.0 with N-potassium hydroxide. 500ml. of n-butyl acetate was added and the mixture was adjusted to pH 2.2 with 2N-hydrochloric acid. The organic phase was treated with 250ml. of water, 34ml. of 2N-ammonium hydroxide and 2.5g. of ammonium acetate. After adjustment to pH 6.0 with acetic acid, the mixture was stirred for 3 hours. The aqueous phase was then separated and 4g. of potassium acetate was added followed by 1,500ml. of acetone. After stirring for 30 minutes the crystal slurry was filtered and the product washed and dried to give 13.8g. of potassium cephalosporin C with a free acid content of 85.7 percent (by bioassay) at an overall efficiency of 71.5 percent.

EXAMPLE 2

6.7 litres of cephalosporin C fermentation broth filtrate at a potency of 2,900 $\mu$g/ml was passed through a column of Amberlite IR 120 in the potassium form to remove excess ammonium ions. The effluent was treated with 245ml. of ethyl acetoacetate and 182ml. of 37 percent aqueous formaldehyde, while maintaining the mixture at pH 7.0, for 105 minutes. 3 litres of n-butyl acetate were then added and the mixture adjusted to pH 2.2, with 2N sulphuric acid. To the separated organic phase was added 500ml. of water, 17g. of ammonium acetate and 2N-ammonium hydroxide to pH 5.5. The mixture was stirred for 3½ hours and the phases were then separated. To the aqueous phase was added 14g. of potassium acetate and 3 litres of acetone. The resulting precipitate was filtered, washed with ethanol and dried in vacuo to give 16.8g. of crude potassium cephalosporin C containing 52 percent free acid (by bioassay).

EXAMPLE 3

An aqueous solution of pure potassium cephalosporin C was reacted with ethyl acetoacetate and formaldehyde and the product extracted into n-butyl acetate by substantially the method described in Example 1. The product was isolated from the organic solution by reextraction into aqueous potassium bicarbonate solution followed by freeze drying of the aqueous solution to give a substantially pure di-potassium salt of 3-acetoxymethyl-7$\beta$-[5-carboxy-5-(2,6-dimethyl-3,5-dicarboethoxy-1,4-dihydropyrid-1-yl)-pentanamido]ceph-3-em-4-carboxylic acid as a yellow solid, $[\alpha]_D$ 103° (C. 1.0 in water), $\lambda_{max}$. 305 nm, $E_{1cm}^{1\%}$ 352, $\nu$ max. (Nujol) 1765 ($\beta$-lactam), 1,740 (COOR), 1718 + 1242 (acetate), 1610 (—COO$^-$), 1675 + 1548 cm.$^{-1}$ (-CONH-). $\tau$ (CF$_3$ COOH - 15 percent D$_2$O)

Dihydropyridyl group 8.73 + 8.77 (3 proton triplets - CH₃CH₂), 5.83 (methylene protans CH₃CH₂), 7.71 + 7.64 (3 proton singlets - 2,6 methyl protons) 7.1 (C 4 methylene protons); D-5-amino-5-carboxypentanamido side chain 7.6 + 8.4 + 8.1 (C 2,3,4 methylene protons), 6.5 (C 5 proton), cephalosporin nucleus 7.88 (3 proton singlet-acetate) 5.06 + 5.26 (C 3 methylene protons), 6.70 + 6.35 (C 2 methylene protons), 4.88 + 4.35 ($\beta$-lactam protons).

The freeze-dried product (19g.) was suspended in 100ml. methylene chloride at 0°C.; 15.8ml. of pyridine and 17.6ml. of dimethyldichlorosilane were added and the mixture was stirred for 40 mins. at 25°C. The temperature was then reduced to −12°C and 8.8g. of phosphorus pentachloride added. The mixture was stirred at this temperature for 2 hours followed by the addition of 11.2ml. of pyridine and 67ml. of methanol. This mixture was stirred at −15°C for 20 minutes and the temperature was then raised to 20°C. The mixture was then added to 58ml. of water and adjusted to pH 3.3 with concentrated ammonium hydroxide solution. After stirring for 30 minutes the resulting suspension was filtered, washed and dried in vacuo to give 5.3g. of crude 7-ACA. The crude acid was purified in 70 percent yield by treating with p-toluene sulphonic acid in an acetone-water mixture to give substantially pure 7-ACA hydrogen p-toluene sulphonate (as identified and assessed by comparison with an authentic sample).

EXAMPLE 4

3-Acetoxymethyl-7$\beta$-[5-carboxy-5-(2,6-dimethyl-3,5-dicarboethoxy-1,4-dihydropyrid-1-yl)-pentanamido]-ceph-3-em-4-carboxylic acid To 1 litre of aqueous solution containing 20 g. of potassium cephalosporin C (free acid content 76 percent) was added 70ml. of ethyl acetoacetate and 52ml. of 37 percent aqueous formaldehyde. The mixture was stirred for 90 minutes maintaining the pH at 7.0 with N-NaOH.

1 litre of isobutyl methyl ketone was added and the mixture adjusted to pH 2.2 with 2N-HCl The organic phase was separated and distilled under vacuum to half bulk, thus removing the water as the isobutyl methyl ketone-water azeotrope. To the concentrate was added, with stirring, 1 equivalent of sodium-2-ethylhexanoate (5.6 g) to give a yellow precipitate of the mono-sodium salt of the title compound. This material was filtered off, washed with isobutyl methyl ketone and dried. Yield 22 g. of a relatively non-hygroscopic product.

The NMR spectrum of the product was consistent with the proposed structure.

Ultraviolet spectrum: $\lambda$ (shoulder) 260 nm; $E_{1cm}^{1\%}$ 133 (ethanol)

$\lambda$ max 302 nm; $E_{1cm}^{1\%}$ 235 (ethanol)

Infrared spectrum (Nujol) $\nu$ max 1765 ($\beta$-lactam), 1740 (COOR), 1718 + 1242 (acetate), 1610 (—COO⁻), 1675 + 1548 cm⁻¹(—CONH-)

Thin layer chromatography: Propanol/water (90/10) Rf = 0.33.

n-Butanol/acetic acid/water (100/10/50) Rf = 0.29.

EXAMPLE 5

Following the procedure of Example 4 but replacing ethyl acetoacetate by methyl acetoacetate, a stable mono-sodium salt product was prepared and isolated.

The product was examined by thin layer chromatography on silica plates and was shown to have the following characteristics:

Solvent n-propanol/water (90/10) - $R_f$ = 0.37

Solvent n-butanol/aceticacid/water (100/10/50)- $R_f$ = 0.25.

EXAMPLE 6

3 litres of cephalosporin C fermentation broth filtrate was passed through a column of Amberlite IR 120 resin in the potassium form to remove excess ammonium ions. 2 litres of the effluent at a potency of 6060 $\mu$g/ml. was treated with 70 ml. of ethyl acetoacetate and 52 ml. of 37 percent aqueous formaldehyde while maintaining the pH at 7.0 for 90 minutes. 1 litre of n-butyl acetate was then added and the mixture adjusted to pH 2.2 with 2N-sulphuric acid. The separated organic phase was then evaporated to half bulk under vacuum to remove water and to the mixture was added a solution of 8 g. sodium 2-ethylhexanoate in 100 ml. of n-butyl acetate. The product was filtered off, washed and dried under vacuum. Yield 17.5 g. of impure mono-sodium salt of the title compound of Example 4.

EXAMPLE 7

The mono-sodium salt of 3-acetoxymethyl-7-$\beta$-[5-carboxy-5-(2,6-dimethyl-3,5-dicarboethoxy-1,4-dihydropyrid-1-yl)pentanamido[-ceph-3-em-4-carboxylic acid (13.468 g., 0.02 mole) prepared as in Example 4 was dissolved in 150 ml. of methylene chloride. Chloroacetyl chloride (7.15 ml., 0.09 mole) was added and the mixture was cooled to 10°C. N,N-Dimethylaniline (8.9 ml., 0.07 mole) was then added over 20 minutes, keeping the temperature in the range 12°–14°C. After cooling to −20°C., 6.4 ml. of N,N-dimethylaniline (0.05 mole) and 10.41g. of phosphorus pentachloride (0.05 mole) were added and the mixture was stirred for 2½ hours at −17°C.

After cooling the reaction mixture to −20°C., 75 ml. of methanol was added and the mixture was stirred at −5°C. for 20 minutes. Then 44 ml. of water was added and sufficient ammonium hydroxide solution to raise the pH to 3.5. The mixture was kept at 5°C. for one hour, after which the suspended 7-ACA was filtered off and dried in vacuo (3.9 g.).

We claim:

1. A process for the recovery of cephalosporin C as a derivative thereof from an aqueous fermentation broth containing cephalosporin C, comprising contacting per mole of cephalosporin C at a temperature of from about 0° to about 50°C and at a pH in the range of about 6 to about 8.5, said broth with at least 1 mole of formaldehyde and 2–30 moles of a $\beta$-ketoester of formula

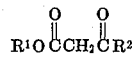

wherein R¹ and R² are independently selected from the group consisting of lower alkyl groups; benzyl and phenethyl groups and such groups substituted by substituents selected from the group consisting of lower alkyl groups, nitro groups and halogen atoms; cyclopentyl and cyclohexyl groups; phenyl, tolyl, p-nitrophenyl, p-halophenyl, $\alpha$-naphthyl and $\beta$-naphthyl groups; and furyl, tetrahydrofuryl, thienyl and pyridyl groups, to convert the cephalosporin C to said derivative which is selected from the group consisting of a compound of formula

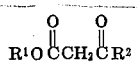

and a salt thereof wherein $R^1$ and $R^2$ are as defined above, and separating said derivative from said aqueous fermentation broth.

2. A process as claimed in claim 1 wherein said aqueous fermentation broth is a fermentation broth which has been acidified and filtered to remove mycelium and other solid impurities.

3. A process as claimed in claim 2 wherein said fermentation broth has been treated with an ion exchange medium to remove ammonium ions.

4. A process as claimed in claim 1 wherein said β-ketoester is ethyl acetoacetate.

5. A process as claimed in claim 1 wherein said derivative of cephalosporin C is separated from said aqueous fermentation broth by extraction into an organic solvent selected from the group consisting of butyl acetate and methyl isobutyl ketone.

6. A process as claimed in claim 5 wherein said derivative is re-extracted from said organic solvent into an aqueous phase with a pH in the range from about 4.0 to about 7.5 whereafter said aqueous phase containing said derivative as a sodium or potassium salt is separated from said organic solvent.

7. A process for the recovery of cephalosporin C from an aqueous fermentation broth containing cephalosporin C, which comprises contacting per mole of cephalosporin C at a temperature of from about 0° to about 50°C and at a pH in the range of about 6 to about 8.5, said broth with at least 1 mole of formaldehyde and 2-30 moles of a β-keto-ester of formula

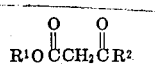

wherein $R^1$ and $R^2$ are independently selected from the group consisting of lower alkyl groups; benzyl and phenethyl groups and such groups substituted by substituents selected from the group consisting of lower alkyl groups, nitro groups and halogen atoms; cyclopentyl and cyclohexyl groups; phenyl, tolyl, p-nitrophenyl, p-halophenyl, α-naphthyl and β-naphthyl groups; and furyl, tetrahydrofuryl, thienyl and pyridyl groups, to convert the cephalosporin C to a derivative selected from the group consisting of a compound of formula

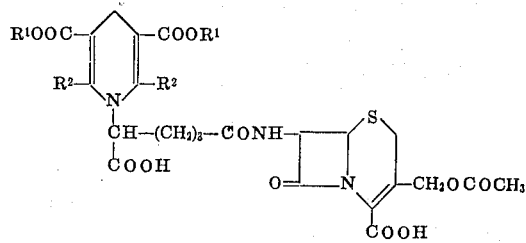

and a salt thereof wherein $R^1$ and $R^2$ are as defined above, separating said derivative from said aqueous fermentation broth and regenerating the cephalosporin C by contacting said derivative with at least one agent selected from the group consisting of an acid addition salt of a mono-lower alkyl amine, glycine, alanine, valine and an ammonium salt of a lower alkanoic acid.

8. A compound selected from the group consisting of a compound of the formula:

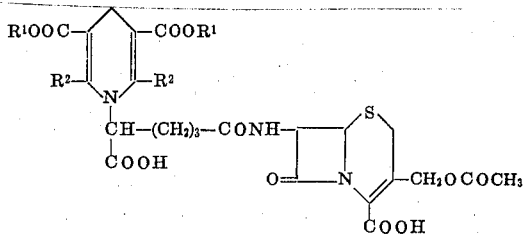

wherein each of $R^1$ and $R^2$ is lower alkyl and an alkali metal salt thereof.

9. A compound selected from the group consisting of 3-acetoxymethyl-7β-[5-carboxy-5-(2,6-dimethyl-3,5-dicarboethoxy-1,4-dihydropyrid-1-yl)-pentanamido]-ceph-3-em-4-carboxylic acid having the formula:

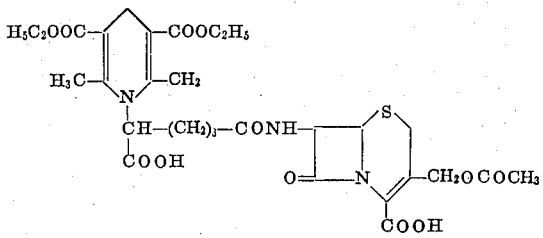

and an alkali metal salt thereof.

10. The dipotassium salt of the compound claimed in claim 9.

11. The monosodium salt of the compound claimed in claim 9.

* * * * *